United States Patent [19]

Tatsukami et al.

[11] 3,864,433

[45] Feb. 4, 1975

[54] CURED RUBBER COMPOSITION COMPISING EPR OR EPDM AND A FLUORINE CONTAINING ETHYLENEPOLYMER

[75] Inventors: Yoshiharu Tatsukami, Niihama; Takashi Futami, Hirakata; Yasuhiro Oda, Takatsuki, all of Japan

[73] Assignees: Sumitomo Chemical company Limited; Daikin Kogyo Co. Ltd., both of Osaka, Japan

[22] Filed: Apr. 22, 1974

[21] Appl. No.: 463,032

[30] Foreign Application Priority Data

Apr. 23, 1973 Japan.............................. 48-46505

[52] U.S. Cl...... 260/897 C, 260/23 X A, 260/45.75
[51] Int. Cl. .............................................. C08f 29/22
[58] Field of Search ................................. 260/897 C

[56] References Cited

UNITED STATES PATENTS 3,651,176  3/1972  Usamoto et al................ 260/897 C Primary Examiner—Murray Tillman
Assistant Examiner—C. J. Seccuro
Attorney, Agent, or Firm—Stevens, Davis, Miller & Mosher

[57] ABSTRACT

A cured rubber composition, which is obtained by curing a composition consisting essentially of an amorphous ethylene-propylene rubber and a fluorine-containing ethylene polymer with an organic peroxide as a curing agent. The cured rubber composition is excellent in heat, chemical, oil and solvent resistance, and hence can be used portions where the convertional ethylene-propylene rubber have not been usable.

16 Claims, No Drawings

CURED RUBBER COMPOSITION COMPISING EPR OR EPDM AND A FLUORINE CONTAINING ETHYLENEPOLYMER

This invention relates to a cured rubber composition consisting essentially of an amorphous ethylene-propylene rubber and a fluorine-containing ethylene polymer.

More particularly, the invention pertains to a cured rubber composition prepared by curing, with an organic peroxide as a curing agent, a composition consisting essentially of (A) an amorphous ethylene-propylene rubber and (B) a fluorine-containing ethylene polymer.

A cured ethylene-propylene rubber is excellent in ozone resistance, weather resistance, heat resistance, etc., but is undesirably low in oil resistance. Furthermore, the cured rubber cannot withstand temperatures above 120°C when used for a long period of time and temperatures above 150°C when used for a short period, and hence has been desired to be further improved in heat resistance.

In order to obtain cured rubber compositions excellent in heat and oil resistance, various processes were effected hitherto with no satisfactory results. For example, a composition comprising an ethylene-propylene rubber and a fluorine rubber high in heat and oil resistance was cured in the presence of a peroxide, but, since the fluorine rubber is not sufficiently curable in a system containing a peroxide, the resulting cured composition was low in mechanical properties and thus no successfully usable cured rubber composition could be obtained. Further, in a process of curing a composition comprising an ehtylene-propylene rubber and an acrylic rubber or the like, such a troublesome step as secondary curing was required for amine curing, so that the process was scarely put into practice.

In view of the above-mentioned disadvantages of the prior art processes, the present inventors made extensive studies on compositions comprising an ethylene-propylene rubber and polymers, which have uniform and favorable elastic properties, are co-curable with an ethylene-propylene rubber in a system containing a peroxide, and are excellent in heat and oil resistance. As the result, the inventors found that a composition consisting essentially of an ethylene-propylene rubber (A) and a fluorine-containing ethylene polymer (B) can be cured with a peroxide to give a cured rubber composition excellent in heat and oil resistance. Based on the above finding, the inventors have accomplished the present invention.

An object of the present invention is to provide a cured rubber composition which has improved the heat resistance and oil resistance of (A) an amorphous ethylene-propylene rubber.

Another object of the invention is to provide a cured rubber composition improved in heat and oil resistance which is prepared by curing a composition consisting essentially of an ethylene-propylene rubber (A) and a fluorine-containing ethylene polymer (B).

Other objects and advantages of the invention will become apparent from the explanation given below.

That is, in accordance with the present invention, there is provided a cured rubber composition prepared by curing, with an organic peroxide as a curing agent, a composition consisting essentially of an amorphous ethylene-propylene rubber (A) and a fluorine-containing ethylene polymer (B).

The amorphous ethylene-propylene rubbers used in this invention include ethylene-propylene copolymers, and ethylene, propylene and non-conjugated diene terpolymer. They can be prepared by copolymerizing ethylene and propylene, or ethylene, propylene and a non-conjugated diene, according to a known process in the presence of a catalyst, particularly a Ziegler-Natta catalyst, well known in the technical field of the present invention (See, for example U.S. Pat. No. 3,341,503). The rubber is composed of 50 to 80 mol% of ethylene and 50 to 20 mol% of propylene, or these monomers in same amount and 0.1 to 10 mol% of a non-conjugated diene. Typical examples of the non-conjugated diene, which is the third monomer of the ethylene-propylene, non-conjugated diene terpolymer, are 1,4-hexadiene, dicyclopentadiene, 5-methylene-2-norbornene, 5-ethylidene-2-norbornene and 4,7,8,9-tetrahydroindene. Among these, dicyclopentadiene and 5-ethylidene-2-norbornene are particulary preferable.

The fluorine-containing ethylene polymer used in this invention includes ethylene-hexafluoropropene copolymer, or ethylene, hexafluoropropene, and other ethylenically unsaturated monomer terpolymer. They can be prepared according to several processes, e.g. a process in which a mixture of ethylene and hexafluoropropene or, a mixture of ethylene, hexafluoropropene and other ethylenically unsaturated monomer, is polymerized in the presence of a free radical initiator under such polymerization conditions as a pressure of 40 to 4,000 kg/cm$^2$ and a temperature of 40° to 300°C; a process in which the mixture is polymerized in the presence of a polymerization modifier selected from ethane, propane, olefins such as propylene, aliphatic ketones, and aldehydes; and an emulsion or suspension polymerization process in which the polymerization is effected under a relatively low pressure (see, for example, U.S. Pat. No. 2,549,935). The amount of the hexafluoropropene should be varied according to the properties of the desired cured rubber composition. A copolymer containing 10 to 50 mol% of hexafluoropropene is preferable. Particularly 20 to 40 mol% is more preferable.

The ethylenically unsaturated monomer includes olefins having 3 to 18 carbon atoms, unsaturated carboxylic acids, vinyl esters containing saturated carboxylic acid moiety having 2 to 6 carbon atoms, acrylic and methacrylic acid esters containing saturated alcohol moiety having 1 to 8 carbon atoms, maleic anhydride, maleic acid monoesters and diesters containing saturated alcohol moiety having 1 to 8 carbon atoms, vinyl and vinylidene halides, vinyl ethers, carboxylic acid amides, and aromatic vinyl compounds. The amount of the ethylenically unsaturated monomer is limited according to the properties of the desired cured rubber composition, but is ordinarily 0 to 50 mol%. Particulary 0 to 20 mol% is preferable.

Concrete examples of the ethylenically unsaturated monomer are propylene, butene-1, isobutylene, pentene-1, hexene-1, octene-1, 3-methyl-1-butene, 3,3-dimethyl-1-butene, 4-methyl-1-pentene, 4,4-dimethyl-1-pentene, 3-methyl-1-pentene, 3,3-dimethyl-1-pentene, decane-1, 5-methyl-1-pentene and octadecene-1; methyl, ethyl, n-propyl, n-butyl and n-octyl esters of acrylic, methacrylic, crotonic, maleic, furmaric, itaconic, acid maleic and acid fumaric acids; vinyl formate, vinyl acetate, vinyl propionate, vinyl butyrate, vinyl laurate, vinyl stearate, vinyl crotonate, vinyl linoleate, vinyl pivalate and vinyl trifluoroacetate; cyclopentyl and cyclohexyl acrylates, methacrylates and crotonates; cyanomethyl, β-cyanoethyl and β-cyanopropyl acrylates, methacrylates and crotonates; hydroxymethyl, hydroxyethyl, hydroxypropyl and hydroxyoctyl acrylates, methacrylates and crotonates; aminomethyl, aminoethyl, aminopropyl, aminobutyl and aminohexyl acrylates, methacrylates and crotonates; acrylonitrile, methacrylonitrile, vinyl chloride, vinyl fluoride, vinylidene chloride, vinylidene fluoride, 1,1,2-trichloroethylene, 1,1,2-trifluoroethylene, tetrachloroethylene, tetrafluoroethylene, 1,1-chlorofluoroethylene, 1,2-difluoroethylene, 1,2-dichloroethylene, 1,1-dichloro-2,2-fluoroethylene and trifluorochloroethylene; methyl vinyl ether, ethyl vinyl ether and phenyl vinyl ether; acrylamides and methacrylamides; N-alkyl-substituted acrylamides such as N-methylacrylamide, N-ethylacrylamide, N-n-propylacrylamide, N-n-butylacrylamide, N-isobutylacrylamide, N-t-butylacrylamide, N-amylacrylamide, N-octylacrylamide and N-2-ethylhexylacrylamide, and N-alkyl-substituted methacrylamides corresponding thereto; N,N-dialkyl-substituted acrylamides such as N,N-dimethylacrylamide, N,N-diethylacrylamide and N,N-di-n-butylacrylamide, and N,N-dialkyl-substituted methacrylamides corresponding thereto; N-methyl-N-vinyl acetamide, styrene and methyl styrene. Among these, propylene, hexene-1, vinyl acetate, methyl and ethyl acrylates and methacrylates, vinyl chloride, vinyl fluoride, vinylidene chloride, vinylidene fluoride, 1,1,2-trichloroethylene, 1,1,2-trifluoroethylene, tetrafluoroethylene, trifluorochloroethylene, N,N'-dimethyl acrylamide, and N,N'-dialkyl-substituted methacrylamide, particularly, methyl and ethyl acrylates and methacrylates, vinyl chloride, vinyl fluoride, vinylidene chloride, vinylidene fluoride, tetrafluoroethylene or trifluorochloroethylene are preferable.

The organic peroxide used in the present invention signifies an organic compound having an +O-O+ bond as curing agents. Such compound includes ketone peroxides, peroxyketals and compounds represented by the general formulas of the types,

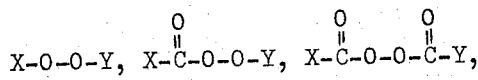

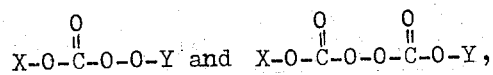

wherein X is an alkyl or aralkyl group having 1 to 20 carbon atoms or a derivative group thereof; and Y is an alkyl or aralkyl group having 1 to 20 carbon atoms or a derivative group thereof, or a hydrogen atom, X and Y may be same or different.

Concrete examples of the organic peroxide are t-butyl hydroperoxide, p-methane hydroperoxide, cumene hydroperoxide, diisopropylbenzene hydroperoxide, di-t-butyl peroxide, 2,5-dimethyl-2,5-di(t-butylperoxy) hexane, 2,5-dimethyl-2,5-(t-butylperoxy) hexyne-3, t-butylcumyl peroxide, dicumyl peroxide α,α-di-(t-butylperoxy) diisopropylbenzene, acetyl peroxide, propionyl peroxide, isobutyryl peroxide, octanoyl peroxide, 3,5,5-trimethylhexanoyl peroxide, decanoyl peroxide, lauroyl peroxide, benzoyl peroxide, p-chlorobenzoyl peroxide, 2,4-dichlorobenzoyl peroxide, diisopropyl perdicarbonate, di-2-ethylhexyl peroxycarbonate, acetylcyclohexane sulfonyl peroxide, t-butyl peracetate, t-butyl perisobutyrate, t-butyl perpivalate, t-butyl per-2-ethylhexanoate, t-butyl perneodecanoate, t-butyl peroxybenzoate, isopropyl t-butyl percarbonate, methyl ethyl ketone peroxide, cyclohexanone peroxide, 1,1'-di-(t-butylperoxy)cyclohexane and 1,1'-di-(t-butylperoxy)-3,3,5-trimethylcyclohexane. Among these, cumene hydroperoxide, 2,5-dimethyl-2,5-diisopropylbenzene hydroperoxide 2,5-dimethyl-2,5-di(t-butylperoxy)hexane, 2,5-dimethyl-2,5-di(t-butylperoxy)hexyne-3, t-butylcumyl peroxide, dicumyl peroxide, α,α'-di(t-butylperoxy) diisopropylbenzene, 3,5,5-trimethylhexanoyl peroxide, decanoyl peroxide, lauroyl peroxide, benzoyl peroxide and t-butyl peroxybenzoate, particularly, t-butylcumyl peroxide, dicumyl peroxide, decanoyl peroxide, benzoyl peroxide and t-butyl peroxybenzoate are preferable.

In the composition of the present invention, the proportions of the ethylene-propylene rubber (A) and the fluorine-containing ethylene polymer (B) are optional, but are preferably 95 to 5 parts by weight and 5 to 95 parts by weight, more preferably 10 to 50 parts by weight and 90 to 50 parts by weight, respectively. The proportion of the organic peroxide used in the preparation of the present composition is 0.1 to 10 parts by weight, preferably 1 to 7 parts by weight, per 100 parts by weight of the composition consisting essentially of the ethylene-propylene rubber (A) and the fluorine-containing ethylene polymer (B). If the proportion is less than 0.1 part, the curing degree becomes low, while if the proportion is more than 10 parts by weight, no further improvement of physical properties are desired so that economical disadvantages are brough about.

The composition of the present invention can be easily obtained by mixing the ethylene-propylene rubber (A) with the polymer (B) by use of a conventional rubber-processing means, e.g. a kneading roll or Bunbury mixer. The thus obtained composition is cured at a temperature in the range from 120°C to 200°C under a pressure in the range from 0.5 to 250 kg/cm², preferably from 1 to 100 kg/cm² for 5 to 60 minutes according to a compression molding method using a hot press, a direct vapor curing method using a vapor, or an indirect curing method, without adoption of any specific procedure. If necessary, the cured composition may be subjected to secondary curing at 110° to 230°C for 0.5 to 24 hours by use of an oven. At the time of curing, the composition may be incorporated with, in addition to the aforesaid organic peroxide as a curing agent, various additives, e.g. an acid acceptor such as magnesium oxide, zinc oxide, lead oxide or calcium oxide, and inorganic filler such as carbon black, talc, white carbon, calcium carbonate, barium sulfate or clay, and, if necessary, a plasticizer and a stabilizer in proportions which have been generally used. The composition may additionally be incorporated with a polyfunctional monomer such as triallyl trimellitate, triallyl isocyanurate, ethylene glycol, dimethacrylate or the like as a curing promotor.

The cured rubber composition of the present invention is excellent in heat, chemical, oil and solvent resistance, and hence can be used at portions where the conventional ethylene-propylene rubbers have not been usable, that is, O-ring, gasket, mechanical seal, fuel-hose, high pressure oil-hose, and the like.

The present invention is illustrated in more detail below with reference to an example, but the example does not limit the scope of the invention. In the example, all parts are by weight, and the measurement of mechanical properties was conducted according to JIS K-6301.

EXAMPLE 1

A stainless steel reactor equipped with an inlet, an outlet, a stirrer and a temperature regulator was fed with a mixture comprising 75 mole % of ethylene and 25 mole % of hexafluoropropene at the rate of 4 kg/hr per liter of inner volume of the reactor. Simultaneously t-butylperoxy-2-ethyl hexanoate as a free radical initiator was added to the reactor at the rate of 15 g/hr. During the polymerization, the inner pressure and the inner temperature was maintained at 1300 kg/cm$^2$ and 195°C, respectively. Thus an ethylenehexafluoropropene copolymer containing 24.6 mole % of hexafluoropropene was formed at the rate of 20 kg/hr. Intrinsic viscosity of the resulting copolymer measured in methyl ethyl ketone at 30°C was 1.42. The copolymer was blended with an ethylene-propylene-non-conjugated diene copolymer (ethylene content: 50 wt %, Iodine value: 10, Third component: 5-ethylidene-2-norbornene, Intrinsic viscosity: 1.52 measured in methyl ethyl ketone at 30°C) in the proportion as shown in Table 1 by the use of a roll at 40° to 50°C.

On the roll, 100 parts by weight of the resulting mixture was kneaded with 40 parts by weight of FEF black, 5 parts by weight of zinc oxide, 1 part by weight of stearic acid, 4 parts by weight of dicumyl peroxide as curing agent, 4 parts by weight of triallyl trimellitate as curing promotor and 2 parts by weight of mercaptobenzimidazole as stabilizer. The mixture thus kneaded was then press-cured at a temperature of 160°C and at a pressure of 100 kg/cm$^2$. Physical properties of the cured product are shown in Table 1.

In Table 1, samples No. 2, No. 3 and No. 4 are the compositions of the present invention, while both samples No. 1 and No. 5 are comparative examples, the former being composed only of an ethylene-propylene-non-conjugated diene copolymer and the latter being composed only of a fluorine-containing ethylene copolymer.

Data of Table 1 demonstrate the superiority of the compositions of the present invention in the heat and oil resistance.

Table 1

| Composition | 1 | 2 | 3 | 4 | 5 |
|---|---|---|---|---|---|
| Ethylene-propylene rubber | 100 | 75 | 50 | 25 | — |
| Fluorine-containing ethylene copolymer | — | 25 | 50 | 75 | 100 |
| FEF Black | 40 | 40 | 40 | 40 | 40 |
| Zinc Oxide | 5 | 5 | 5 | 5 | 5 |
| Stearic acid | 1 | 1 | 1 | 1 | 1 |
| Triallyl trimellitate | 4 | 4 | 4 | 4 | 4 |
| Dicumyl peroxide | 4 | 4 | 4 | 4 | 4 |
| Mercaptobenzimidazole | 2 | 2 | 2 | 2 | 2 |
| Physical properties of cured rubber composition | | | | | |
| Curing time (min.) (160°C) | 30 | 25 | 25 | 20 | 15 |
| 200 * Modulus (kg/cm$^2$) | — | 79 | 109 | 114 | 80 |
| Tensile strength (kg/cm$^2$) | 129 | 160 | 190 | 182 | 206 |
| Elongation (*) | 150 | 140 | 140 | 150 | 210 |
| Heat resistance (150°C × 10 days) | | | | | |
| Residual tensile | 95 | 103 | 91 | 95 | 100 |
| Residual elongation (*) | 80 | 93 | 93 | 93 | 95 |
| Heat resistance (170°C × 5 days) | | | | | |
| Residual tensile Strength (%) | 15 | 17 | 40 | 101 | 110 |
| Residual elongation (%) | 0 | 7 | 36 | 87 | 90 |
| Oil resistance (ASTM, No. 3 oil 100°C × 70 hours) | | | | | |
| Volume change ratio (%) | 103.9 | 83.5 | 58.0 | 35.5 | 15.3 |

EXAMPLE 2

An ethylene-hexafluoropropene copolymer having intrinsic viscosity of 0.75 as measured in methyl ethyl ketone at 30°C and 29 mole % of hexafluoropropene, which had been prepared with an apparatus similar to that of Example 1, was blended with ethylene-propylene-non-conjugated diene copolymer (which is the same as used in Example 1) in the proportion as shown in Table 2 by the use of a roll at 40° to 50°C. Then the resulting mixture was kneaded with other components as shown in Table 2 and cured in the similar manner to Example 1. Physical properties of the cured product are shown in Table 2.

In Table 2, the samples No. 7, No. 8 and No. 9 are the compositions of the present invention, while both the samples No. 6 and No. 10 are comparative examples, the former being composed only of an ethylene-propylene copolymer and the latter being composed only of a fluorine-containing ethylene copolymer. Data of Table 2 demonstrate the superiority of the compositions of the present invention in the heat and oil resistance.

Table 2

| Composition | 6 | 7 | 8 | 9 | 10 |
| --- | --- | --- | --- | --- | --- |
| Etylene-propylene rubber | 100 | 75 | 50 | 25 | — |
| Fluorine-containing ethylene copolymer | — | 25 | 50 | 75 | 100 |
| FEF Black | 40 | 40 | 40 | 40 | 40 |
| Zinc oxide | 5 | 5 | 5 | 5 | 5 |
| Stearic acid | 1 | 1 | 1 | 1 | 1 |
| Triallyl trimellitate | 2.5 | 2.5 | 2.5 | 2.5 | 2.5 |
| Dicumyl peroxide | 3 | 3 | 3 | 3 | 3 |
| Mercaptobenzimidazole | 1 | 1 | 1 | 1 | 1 |
| Physical properties of cured rubber composition | | | | | |
| Curing time (min.) (160°C) | 30 | 25 | 25 | 20 | 15 |
| Tensile strength (kg/cm$^2$) | 125 | 152 | 173 | 170 | 187 |
| Elongation (%) | 200 | 200 | 210 | 230 | 250 |
| Heat resistance (150°C × 10 days) | | | | | |
| Residual tensile strength (%) | 97 | 101 | 100 | 101 | 104 |
| Residual elongation (%) | 83 | 94 | 97 | 95 | 102 |
| Heat resistance (170°C × 5 days) | | | | | |
| Residual tensile Strength (%) | 18 | 20 | 52 | 105 | 104 |
| Residual elongation (%) | 0 | 10 | 45 | 95 | 100 |
| Oil resistance (ASTM, No. 3 oil 100°C × 70 hours) | | | | | |
| Volume change ratio (%) | 107.0 | 68.0 | 39.5 | 28.3 | 10.5 |

What is claimed is:

1. A cured rubber composition prepared by curing, with an organic peroxide as a curing agent, a composition consisting essentially of (A) 95 to 5 parts by weight of an amorphous ethylene-propylene and rubber and (B) 5 to 95 parts by weight of a fluorine-containing ethylene polymer selected from the group consisting of ethylene-herafluoropropene copolymer and ethylene-hexafluoropropene-ethylenically unsaturated monomer terpolymer, said copolymer or terpolymer containing 10 to 50 mole% of hexafluoropropene.

2. A cured rubber composition according to claim 1, wherein the amorphous ethylene-propylene rubber is an ethylene-propylene copolymer.

3. A cured rubber composition according to claim 1, wherein the amorphous ethylene-propylene rubber is ethylene, propylene and a non-conjugated diene terpolymer.

4. A cured rubber composition according to claim 1, wherein the organic peroxide is added in a proportion of 0.1 to 10 parts by weight per 100 parts by weight of the composition.

5. A cured rubber composition according to claim 1, wherein the curing is carried out at a temperature of 120° to 200°C.

6. A cured rubber composition according to claim 1, wherein the curing is carried out under a pressure of 0.5 to 250 kg/cm$^2$.

7. A cured rubber composition according to claim 1, wherein the organic peroxide is at least one member selected from the group consisting of compounds represented by the general formula,

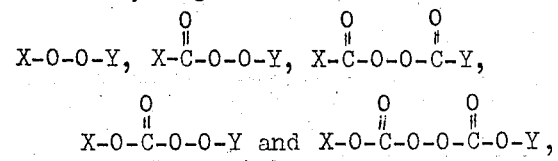

wherein X represents an alkyl or aralkyl group having 1 to 20 carbon atoms and derivative groups thereof, Y represents an alkyl or aralkyl group having 1 to 20 carbon atoms and derivative group thereof and a hydrogen atom, X and Y being the same or different.

8. A cured rubber composition according to claim 7, wherein the organic peroxide is t-butylcumyl peroxide, dicumyl peroxide, decanoylperoxide, benzoyl peroxide or t-butyl peroxybenzoate.

9. A cured rubber composition according to claim 3, wherein the non-conjugated diene is 1,4-hexadiene, dicyclopentadiene, 5-methylene-2-norbornene, 5-ethylidene-2-horbornene or 4,7,8,9-tetrahydroindene.

10. A cured rubber composition according to claim 7, wherein the non-conjugated diene is dicylopentadiene or 5-ethylidene-2-norbornene.

11. A cured rubber composition according to claim 1, wherein a proportion of ethylene and propylene in the amorphous ethylene-propylene rubber is 50 to 80 mole % and 50 to 20 mole %, respectively.

12. A cured rubber composition according to claim 1, wherein a proportion of the non-conjugated diene in the amorphous ethylene-propylene rubber is 0.1 to 10 mole %.

13. A cured rubber composition according to claim 1, wherein the ethylenically unsaturated monomer in the fluorine-containing ethylene copolymer is methyl and ethyl acrylates and methacrylates, vinyl chloride, vinyl fluoride, vinylidene chloride, vinylidene fluoride, tetrafluoroethylene or trifluorochloroethylene.

14. A cured rubber composition according to claim 1, wherein a proportion of ethylenically unsaturated monomer in the fluorine-containing ethylene polymer is 0 to 50 mole %.

15. A cured rubber composition according to claim 1, wherein the composition is incorporated with additives.

16. A cured rubber composition according to claim 15, wherein the additives are acid acceptors, inorganic fillers and curing promotors.

* * * * *